Jan. 10, 1961  R. J. HELTON  2,967,721
FIFTH WHEEL ELEVATING DEVICE
Filed March 13, 1959
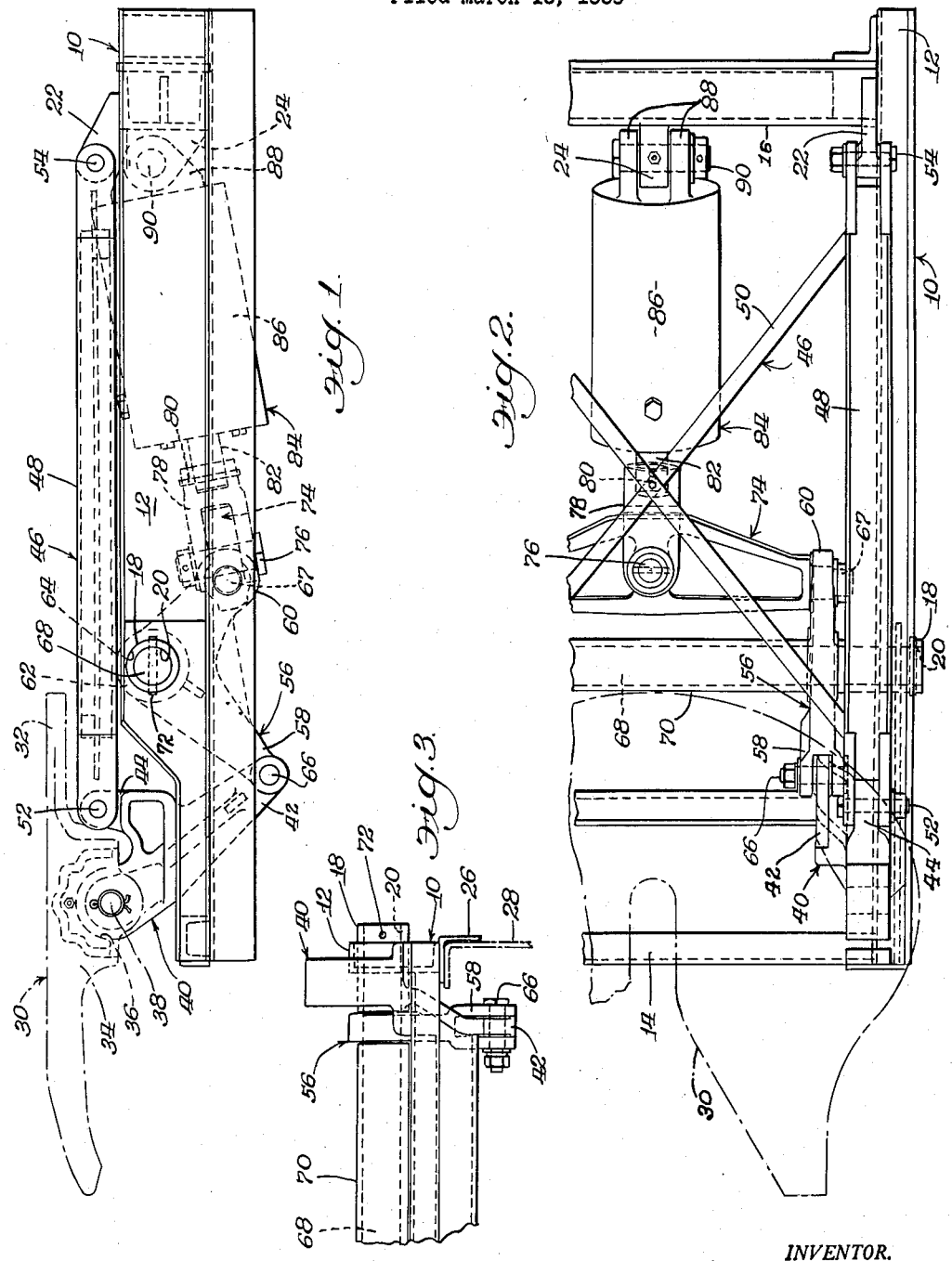
INVENTOR.
Robert J. Helton
BY Walter L. Schlegel, Jr.
Atty.

United States Patent Office 2,967,721
Patented Jan. 10, 1961

2,967,721

FIFTH WHEEL ELEVATING DEVICE

Robert J. Helton, Munster, Ind., assignor to American Steel Foundries, Chicago, Ill., a corporation of New Jersey Filed Mar. 13, 1959, Ser. No. 799,280

10 Claims. (Cl. 280—425)

This invention relates to fifth wheel coupling mechanisms, of the type used to connect highway tractor type vehicles to semitrailers, and particularly to a device for raising and lowering a fifth wheel carried by a tractor.

Devices of this type are employed on special tractors used in motor freight terminals or dock yards where semi-trailers are constantly being shuffled about from one location to another within the terminal area.

The function of these fifth wheel elevating devices is to expedite the relocation of semi-trailers by eliminating the necessity for manually raising and lowering the trailer landing gear before and after every coupling operation.

These devices are normally power operated and can be controlled from within the tractor cab, so that an operator can, without leaving the cab, lower the fifth wheel, back under a trailer, the front end of which is supported by its extended landing gear, raise the fifth wheel, and pick up the trailer and drive away. This process can be reversed when the trailer is spotted at another location.

It is an object of this invention to provide a power operated fifth wheel elevating device of simple design and construction with relatively few parts and which is economical from the viewpoints of both production and maintenance.

A more specific object of the invention is the provision of a fifth wheel elevating device adapted for attachment to the chassis of any standard tractor so that a fifth wheel can be elevated by a pair of dead bell crank levers which are actuated by a single power cylinder pivotally mounted and connected to both levers through an equalizer member.

These and other objects of the invention will be apparent from an examination of the following description and drawings, wherein:

Figure 1 is a fragmentary side elevational view of a fifth wheel elevating device embodying features of the invention;

Figure 2 is a top plan view of a portion of the structure illustrated in Figure 1, only one side of the structure being shown as it is symmetrical about its longitudinal vertical center plane, and Figure 3 is an end elevational view of a portion of the structure illustrated in Figure 2, as seen from the left.

It will be understood that certain elements have been intentionally omitted from certain views where they are better illustrated in other views.

Referring now to the drawings for a better understanding of the invention, it will be seen that the moving parts of the fifth wheel elevating device are supported on a frame assembly or structure indicated generally at 10. The frame structure comprises a pair of parallel longitudinally extending transversely spaced side elements 12 which are interconnected adjacent their forward and rearward ends by a pair of parallel transversely extending longitudinally spaced front and rear end elements 14 and 16, respectively, which are preferably formed integrally with or rigidly secured to the side elements. The side elements 12 each include a generally cylindrical housing or journal portion 18 having extending therethrough a cylindrical aperture or bore 20, the purpose of which will be explained hereinafter. The housings 18 of the respective side elements are located with their openings 20 in alignment with each other longitudinally of the frame. The rear end element 16 may be provided with a pair of forwardly extending lugs 22 disposed adjacent the outboard extremities of the end element in the area immediately adjacent the respective side elements 12. End element 16 may also be provided with another forwardly extending lug 24 disposed substantially centrally thereof. Both the center and end lugs 24 and 22, respectively, are preferably formed integrally with or rigidly secured to end element 16.

As best seen in Figure 3, there may be provided a pair of longitudinally extending mounting angle brackets 26 rigidly secured in any desired manner, not shown, to the undersides of side elements 12. The angle brackets 26 are preferably arranged and disposed to accommodate their semi-permanent connection in any desired manner, not shown, to the frame or chassis 28 of a tractor (not shown).

The elevating device illustrated in the drawing is adapted to support a fifth wheel assembly indicated generally at 30. Inasmuch as the structural details of the fifth wheel assembly do not form an essential feature of this invention, they are not illustrated in detail, but may be of any type, such as that illustrated in Patent No. 2,856,203, that is adapted to be pivotally mounted on mounting brackets secured to the frame or chassis of a tractor.

The fifth wheel assembly includes a tractor engaging and king pin receiving plate 32 having an integral peripheral depending flange 34 which presents a pair of mounting bracket receiving pockets 36 at opposite sides of the fifth wheel assembly.

As best seen in Figures 1 and 2, the fifth wheel assembly is pivotally mounted, for limited rotation about a horizontal axis extending transversely of the tractor, on a pair of axially aligned pins 38 which connect flange 34 to a pair of mounting brackets 40 which are received within the respective mounting bracket pockets 36 of the fifth wheel assembly. As best seen in Figure 1, each mounting bracket includes a depending arm 42 and an integral lug 44 extending upwardly from the arm.

Mounting bracket 40 may be supported from the frame structure 10 by a strut assembly indicated generally at 46 and which, as best seen in Figure 2, includes a pair of longitudinally extending side elements 48 (only one of which is shown) disposed inboardly adjacent side elements 12 of the frame and which are interconnected adjacent their ends by a pair of preferably integrally forward intersecting cross elements 50. The strut assembly side elements 48 may be pivotally connected adjacent their forward ends by pins 52 to the mounting bracket lugs 44, and they may be connected adjacent their rearward ends by pins 54 to respective frame lugs 22.

Additionally, the fifth wheel assembly may be supported by a pair of bell crank levers 56, each of which includes front and rear arms 58 and 60, respectively, extending forwardly and rearwardly from a hub 62 which has cylindrical aperture or bore 64 extending transversely therethrough. The front arms 58 of the bell crank levers may be pivotally connected by pins 66 to the respective mounting bracket arms 42.

Bell crank levers 56, as best seen in Figure 3, may be fulcrumed to the side elements of the frame by means of a shaft 68. The levers are rotatably mounted on the shaft with the ends of the shaft being journalled within the openings 20 of frame side element housings 18. The bell crank levers are preferably disposed inwardly adjacent respective housings 18 and may be maintained in proper position by means of a cylindrical spacer element 70 sleeved over the shaft 68 between the respective bell crank levers. The shaft may be maintained in housings 18 by a pair of retaining pins 72 located adjacent the outboard extremities of the respective housings.

The arms 60 of the bell crank levers, as best seen in Figure 2, extend rearwardly from the fifth wheel and are rotatably mounted on opposite ends 67 of a transversely extending equalizer member 74. The equalizer member may be of any design, such as the truss type structure illustrated, and may be pivotally connected intermediate its ends by a pin 76 to a jaw or clevis 78 which in turn is pivotally connected by a pin 80 to a push rod 82 extending from a power cylinder 84. The power cylinder includes a housing 86 having extending from its rearward extremity a pair of lugs 88 which may be pivotally connected by a pin 90 to lug 24 presented by the frame end element 16.

To describe the operation of the device, it will be understood that as the power cylinder is energized, rod 82 moves to the left, as seen in Figure 2, thereby moving the equalizer member 74 to the left and causing the bell crank levers to rotate in a clockwise direction about shaft 68, as best seen in Figure 1. As the bell crank levers rotate in a clockwise direction, the fifth wheel assembly is moved vertically upward and at the same time is maintained in a substantially horizontal or level position by means of the strut assembly 46. The operation is reversed to lower the fifth wheel, and as the power cylinder is de-energized it urges equalizer to the right and thereby causes the bell crank levers to rotate in a counter-clockwise direction, as seen in Figure 1, and lower the fifth wheel.

Thus, it will be understood that when an operator of a tractor desires to pick up and relocate a semi-trailer, which is supported on its landing gear, all the operator need do is to move the fifth wheel assembly on the tractor to its lowermost position, back under the front end of the semi-trailer, elevate the fifth wheel assembly, in the manner previously described, effect a coupling between the trailer and tractor, and drive away.

I claim:

1. In a fifth wheel elevating device for highway tractor-trailer vehicles, the combination of: a frame, for attachment to the chassis of a tractor, including a pair of spaced longitudinal elements interconnected by at least one transverse element; a fifth wheel, for detachable connection to a trailer; a pair of mounting brackets pivotally connected to opposite sides of the fifth wheel member; a strut member including a pair of longitudinally extending strut elements disposed adjacent respective longitudinal frame elements and having their opposite ends pivotally connected to the transverse frame element and the respective mounting brackets, respectively; a power cylinder positioned centrally of said frame with its axis disposed to extend parallel to said longitudinal elements, said power cylinder being pivotally connected to said frame transverse element and having a rod extending therefrom toward said fifth wheel member; a transversely extending equalizer member connected intermediate its ends to the power cylinder rod; and a pair of bell crank levers fulcrumed intermediate their ends to respective longitudinal elements of the frame, said levers having certain corresponding ends pivotally connected to opposite ends of said equalizer member and having their opposite corresponding ends pivotally connected to the respective mounting brackets at locations spaced from the pivotal connections between said brackets and said longitudinal strut elements.

2. In a fifth wheel elevating device for highway tractor-trailer vehicles, the combination of: a frame, for attachment to the chassis of a tractor, including a pair of spaced longitudinal elements interconnected by at least one transverse element; a fifth wheel, for detachable connection to a trailer; a pair of mounting brackets pivotally connected to opposite sides of the fifth wheel member; a strut member including a pair of longitudinally extending strut elements disposed adjacent respective longitudinal frame elements and having their opposite ends pivotally connected to the transverse frame element and to the mounting brackets, respectively; a power cylinder positioned with its axis disposed to extend parallel to said longitudinal elements, said power cylinder being pivotally connected to said frame transverse element and having a rod extending therefrom toward said fifth wheel member; a transversely extending equalizer member connected intermediate its ends to the power cylinder rod; and a pair of bell crank levers fulcrumed intermediate their ends to respective longitudinal elements of the frame, said levers having certain corresponding ends pivotally connected to opposite ends of said equalizer member and having their opposite ends pivotally connected to the respective mounting brackets.

3. In a fifth wheel elevating device for highway tractor-trailer vehicles, the combination of: a frame, for attachment to the chassis of a tractor, including a pair of spaced longitudinal elements interconnected by at least one transverse element; a fifth wheel, for detachable connection to a trailer; a pair of mounting brackets pivotally connected to opposite sides of the fifth wheel member; a strut member having opposite ends pivotally connected to the transverse frame element and the mounting brackets, respectively; a power cylinder pivotally connected to said frame transverse element and having a rod extending therefrom toward said fifth wheel member; an equalizer member connected intermediate its ends to the power cylinder rod; and a pair of bell crank levers fulcrumed intermediate their ends to respective longitudinal elements of the frame, said levers having certain corresponding ends pivotally connected to opposite ends of said equalizer member and having their opposite corresponding ends pivotally connected to the respective mounting brackets.

4. In a fifth wheel elevating device for highway tractor-trailer vehicles, the combination of: a frame, for attachment to the chassis of a tractor; a fifth wheel, for detachable connection to a trailer; a pair of mounting brackets pivotally connected to opposite sides of the fifth wheel member; a strut member having opposite ends pivotally connected to the frame and the mounting brackets, respectively; a power cylinder pivotally connected to said frame and having a rod extending therefrom toward said fifth wheel member; an equalizer member connected intermediate its ends to the power cylinder rod; and a pair of bell crank levers fulcrumed intermediate their ends to the frame, said levers having certain corresponding ends pivotally connected to opposite ends of said equalizer member and having their opposite corresponding ends pivotally connected to the respective mounting brackets.

5. In an elevating device for fifth wheels, the combination of: a frame including a pair of longitudinal elements interconnected by a transverse element; bracket means for pivotal connection to a fifth wheel; a strut member having opposite ends pivotally connected to the bracket means and the frame transverse element, respectively; a power cylinder having one portion pivoted to said frame transverse element and having another relatively movable portion extending therefrom; an equalizer member connected intermediate its ends to said other portion; and a pair of bell crank levers fulcrumed intermediate their ends to the longitudinal elements of the frame and having corresponding opposite ends pivotally connected to the bracket means and the opposite ends of the equalizer member, respectively.

6. In an elevating device for fifth wheels, the combination of: a frame; bracket means for pivotal connection to a fifth wheel; a strut member pivotally connected to the bracket means and to the frame; a power cylinder having one portion pivoted to the frame and having another relatively movable portion extending therefrom;

a transversely extending equalizer member having intermediate its ends a universal type connection to said other portion; and a pair of bell crank levers fulcrumed to the frame and having corresponding portions pivotally connected to the bracket means and equalizer member, respectively.

7. In a fifth wheel elevating device, the combination of: a frame; a power device having a pair of relatively movable elements, one of which is pivotally connected to the frame; a pair of bell crank levers fulcrumed to the frame on opposite sides of the power device; means for pivotally connecting the levers to a fifth wheel; and equalizer means for connecting the levers to the power device, said equalizer means including a transversely extending beam having intermediate its ends a universal type connection to the other of said power device elements and having on opposite sides of said universal type connection a pair of pivotal connections with the respective levers.

8. In a fifth wheel elevating device, the combination of: a frame; a power device having a pair of relatively movable elements, one of which is pivotally connected to the frame; a bell crank lever fulcrumed to the frame and operatively connected to the other of said power device elements; a mounting bracket having means for pivotal connection to a fifth wheel and having spaced from said means a pivotal connection with the lever; and an elongated strut member disposed to extend longitudinally of the frame for the major portion of the frame length, said strut member having one end pivotally connected to the frame and having the other end pivotally connected to the mounting bracket at a location spaced from its places of pivotal connection to the fifth wheel and the lever.

9. In a fifth wheel elevating device, the combination of: a frame; a power device having a pair of relatively movable elements, one of which is pivotally connected to the frame; a bell crank lever fulcrumed to the frame and operatively connected to the other of said power device elements; an elongated strut member having one end pivotally connected to the frame; and a mounting bracket for connecting a fifth wheel to the strut member and the lever, said mounting bracket having separate means spaced from each other for independent pivotal connections to the fifth wheel, the lever, and the strut member, respectively.

10. A fifth wheel elevating device according to claim 9, wherein said mounting bracket comprises a head portion adapted for receipt within a cavity of the fifth wheel, and a pair of arms extending from said head portion, and wherein the means for pivotally connecting the mounting bracket to the fifth wheel is disposed in said head portion, and wherein the means for pivotally connecting the mounting bracket to the lever and the strut member are disposed in the respective arms.

References Cited in the file of this patent

UNITED STATES PATENTS

| | | |
|---|---|---|
| 2,482,868 | Pollard | Sept. 27, 1949 |
| 2,515,575 | Van Langen | July 18, 1950 |